UNITED STATES PATENT OFFICE.

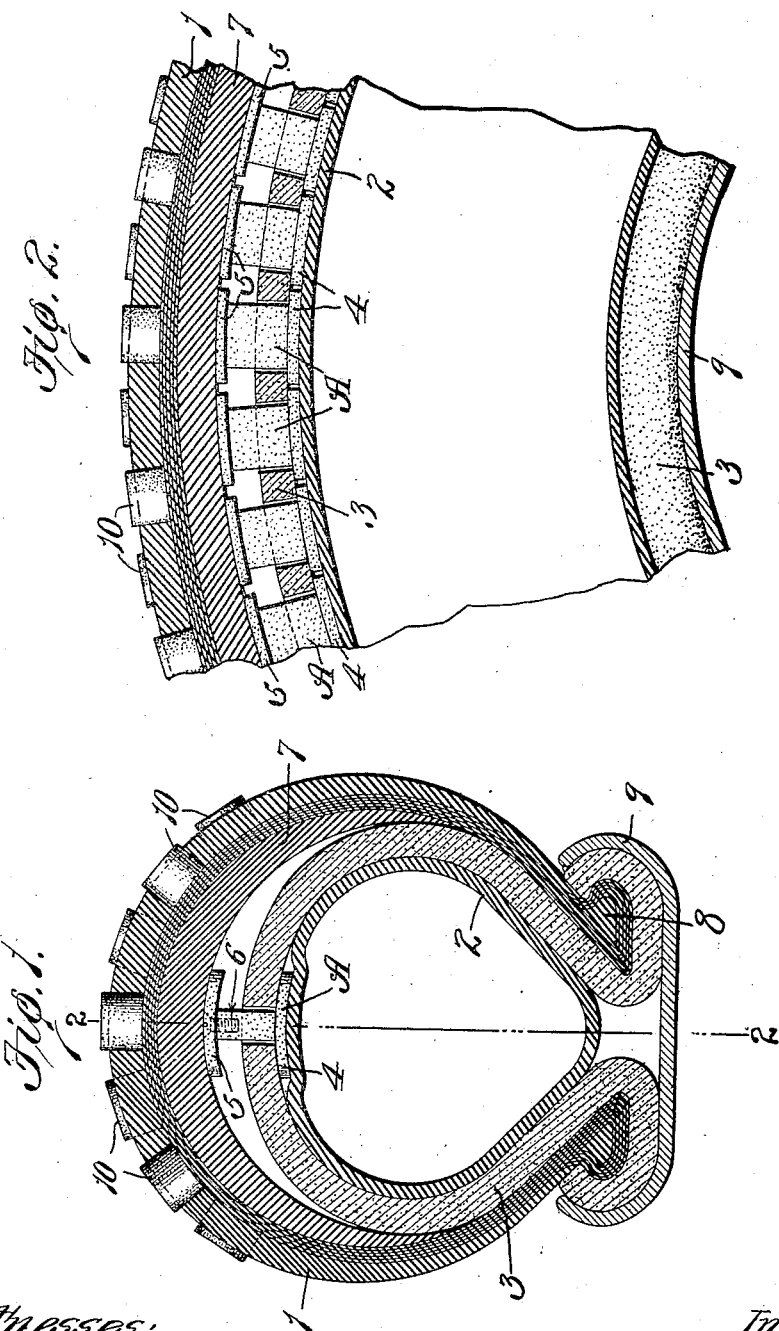

CHARLES R. RAWDON, OF ST. LOUIS, MISSOURI.

NON-PUNCTURABLE TIRE.

968,980.  Specification of Letters Patent. Patented Aug. 30, 1910.

Application filed August 21, 1909. Serial No. 513,931.

*To all whom it may concern:*

Be it known that I, CHARLES R. RAWDON, a citizen of the United States, residing at St. Louis, Missouri, have invented a certain new and useful Improvement in Non-Puncturable Tires, of which the following is a full, clear, and exact description, such as will enable others skilled in the art to which it appertains to make and use the same.

This invention relates to pneumatic tires, and particularly to that type of tires which comprise an inner tube arranged inside of an outer casing.

One object of my invention is to provide a pneumatic tire which is so constructed that the inner tube cannot be punctured.

Another object is to provide a pneumatic tire which is so constructed that the outer casing cannot "blow out" in case the inner tube bursts.

Figure 1 of the drawings is a cross sectional view of a pneumatic tire constructed in accordance with my invention; and Fig. 2 is a longitudinal sectional view taken on the line 2—2 of Fig. 1.

Referring to the drawings which illustrate the preferred form of my invention, 1 designates the outer casing of my improved tire, and 2 designates the flexible inner tube arranged inside of same. The protecting member 3 is arranged between the inner tube and the outer casing, as shown in Fig. 1, and said member is spaced away from the outer casing so as to permit said outer casing to yield or move relatively to said protecting member. The means herein shown for supporting the outer casing and transmitting the movements of same to the inner tube consists of a plurality of devices A which pass through the protecting member 3 and contact with the outer surface of the inner tube 2 and the inner surface of the outer casing 1. The protecting member 3 is made of some tough and hard material that cannot be punctured or broken easily, such, for example, as insulating fiber, and each of the devices A preferably consists of a shank that passes through an opening in the protecting member 3 and provided with heads 4 and 5 that bear, respectively, on the inner tube and on the outer casing, as shown in Fig. 1. If desired, these devices A can be formed of fiber and the heads 4 and 5 so shaped that they will conform to the curvature of the inner tube and outer casing. In the construction herein shown the head 4 of each of the devices A is formed integral with the shank that passes through the protecting member 3, and the head 5 is secured to said shank by a fastening device 6. I wish it to be understood, however, that my broad idea is not limited to this exact construction and that various other means than that herein shown could be employed for supporting the outer casing or transmitting the movements of same to the inner tube. I also prefer to arrange a comparatively thick piece of flexible material 7, such, for example, as rubber, on the inside of the outer casing and vulcanize it to same so as to form a bearing surface for the devices A and thus prevent said devices from wearing or cutting through the layers of canvas or fabric which usually form part of the outer casing of a pneumatic tire, but, if desired, this piece of flexible material 7 could be omitted. The protecting member 3 preferably surrounds or covers the lugs 8 on the edge portions of the outer casing so that the rim 9 of the wheel on which the tire is used will not bear directly on the outer casing and consequently will not cut or damage same. The tread portion of the outer casing is preferably provided with pieces 10 of some hard substance that is molded in the rubber which forms the outer layer of the outer casing 1. Insulating fiber is very well adapted for this purpose as it has great wear-resisting qualities but various other substances could be used to form these inserts 10.

A tire of the construction above described is non-puncturable for the protecting member 3 prevents any sharp object which penetrates the outer casing from coming in contact with the inner tube. Another desirable feature of such a tire is that the outer casing cannot "blow out" if the inner tube bursts for the protecting member 3, which is interposed between the inner tube and outer casing, is formed of material that is strong enough to withstand a greater strain than that which would be produced by the bursting of the inner tube. The tire is just as resilient as the ordinary pneumatic tire owing to the fact that the outer casing is supported by a number of devices which bear directly on the inner tube and thus transmit the pressure on said outer casing to the inner tube in practically the same manner as if the inner tube were in direct contact with the outer casing. The heads on the devices A are preferably made large enough so that said devices will have a substantial bearing on the inner tube and on the outer casing; and, if desired, the shanks of the devices A can be made non-circular shape in cross section so that they will not rotate or turn in the protecting member 3. When the inner tube is inflated the devices A hold the outer casing spaced away from the protecting member 3, as shown in Fig. 1, so that said outer casing can yield when it comes in contact with obstructions or irregularities in the surface over which it is traveling, the inner tube 2 acting as a cushion to absorb the shocks in practically the same manner as the inner tube of an ordinary pneumatic tire. In view of the fact that the protecting member 3 is interposed between the wheel rim 9 and the outer casing, said rim cannot cut the outer casing or damage same. The inserts 10 prevent the tire from skidding, and as said inserts are of the same thickness as the rubber tread of the outer casing the tire will be provided with inserts of tough material as long as the tread of the outer casing lasts.

As previously stated, I do not wish it to be understood that my broad idea is limited to the specific means herein shown for supporting the outer casing and holding it spaced away from the protecting member 3. Nor do I wish it to be understood that said protecting member 3 has to be formed of insulating fiber for various other tough non-puncturable materials could be used to form said member. It is preferable to have the protecting member surround the lugs 8 on the edge portions of the outer casing but this also is a minor detail of my tire and could be omitted if desired. An outer casing of the construction herein shown; namely, one in which the tread portion is provided with inserts of tough material, is, of course, not limited in its use to a pneumatic tire of the type herein shown as this idea could be embodied in any of the ordinary pneumatic tires now in general use.

Having thus described my invention, what I claim as new and desire to secure by Letters Patent is:

1. A pneumatic tire comprising an inner tube, an outer casing, a protecting member arranged between said tube and casing, and movable devices passing through said protecting member and bearing against the inner surface of the casing and the outer surface of said tube for supporting said casing.

2. A pneumatic tire comprising an outer casing, an inflated inner tube arranged inside of same, rigid means arranged inside of the casing and bearing against said tube and the inner surface of the casing for supporting said casing and transmitting the movements of same to said inner tube, and a member formed of tough material arranged inside of said casing for protecting said inner tube.

3. A pneumatic tire comprising an outer casing, an inner tube, a protecting member arranged between said tube and casing and provided with openings, and devices passing loosely through the openings in said protecting member and provided with heads that contact with the outer casing and the inner tube.

In testimony whereof I hereunto affix my signature in the presence of two witnesses, this nineteenth day of August, 1909.

CHARLES R. RAWDON.

Witnesses:
 CORA BADGER,
 GEORGE BAKEWELL.